United States Patent [19]
Lundquist, Jr. et al.

[11] 3,956,009
[45] May 11, 1976

[54] METHOD FOR DRYING FRUCTOSE SOLUTIONS

[75] Inventors: Joseph Theodore Lundquist, Jr., Ellicott City; Preston Leonard Veltman, Severna Park; Edward Theodore Woodruff, Woodbine, all of Md.

[73] Assignee: W. R. Grace & Co., New York, N.Y.

[22] Filed: May 14, 1975

[21] Appl. No.: 577,218

[52] U.S. Cl. .................. 127/62; 127/58; 127/61; 159/48 R
[51] Int. Cl.² .................. B01D 1/18; C13K 11/00
[58] Field of Search ............. 127/30, 61, 62, 60; 159/4 R, 48 R

[56] References Cited
UNITED STATES PATENTS

| | | |
|---|---|---|
| 3,477,874 | 11/1969 | Repsdorph ............... 127/61 X |
| 3,513,023 | 5/1970 | Kusch ..................... 127/30 X |
| 3,600,222 | 8/1971 | Veltman .................. 127/62 X |
| 3,674,556 | 7/1972 | Gray, Jr. ................. 127/62 |
| 3,674,557 | 7/1972 | Gray, Jr. ................. 127/62 |
| 3,684,573 | 8/1972 | Voigt ..................... 127/30 |
| 3,704,169 | 11/1972 | Woodruff ................. 127/62 |
| 3,706,599 | 12/1972 | Woodruff ................. 127/62 |
| 3,883,365 | 5/1975 | Forsberg ................. 127/30 X |

*Primary Examiner*—Morris O. Wolk
*Assistant Examiner*—Sidney Marantz
*Attorney, Agent, or Firm*—Arthur P. Savage

[57] ABSTRACT

A process for preparing dried, solid, particulate fructose products from fructose solutions by drying the solution in a current of heated air and in the presence of separately introduced recycled dried product solids.

9 Claims, No Drawings

METHOD FOR DRYING FRUCTOSE SOLUTIONS

This invention relates to improvements in the production of dried fructose products from fructose solutions, and more specifically to a procedure for spray drying fructose solutions in the presence of recycled product solids to obtain dry, finely divided, free-flowing particulate fructose solids.

Methods for producing dry particulate fructose products described in the prior art involve the crystallization of fructose from alcohol solution. The crystallization of fructose from solution is a tedious, time consuming process which has thus been previously conducted on a laboratory scale. For this reason, dry solid particulate fructose has for the most part been considered a specialty chemical. Traditionally, large quantities of fructose have been available only in the form of aqueous solution.

To date, particulate fructose, which is about one and one-half times as sweet as sucrose, has not been generally available as a consumer product. Recently, processes have been developed by which commercial yields of substantially pure fructose may be economically obtained by conversion of sucrose or glucose. However, for lack of a commercially feasible drying process, the fructose thus obtained has been utilized in the form of an aqueous solution.

It is therefore an object of the present invention to provide a new and more efficient process for producing dried fructose products from solutions thereof.

It is another object to provide a procedure for spray drying fructose solutions using heated air.

It is a further object to provide an economical process for spray drying fructose by which a freeflowing particulate fructose may be obtained with little or no thermal degradation of the product.

Other objects and the advantages of the invention will be evident from the following description thereof.

In accordance with the present invention it has been discovered that fructose solutions can be dried in the presence of recycled product solids using a drying gas (preferably air) having an outlet temperature of from about 60° to 120°C while maintaining the average air residence time in the drying zone in the range of from 4 to 30 seconds (calculated by dividing the drying zone volume by the volume flow rate of the hot drying gas therethrough). While the relationship between gas outlet temperature and average gas residence time is not necessarily linear, it is generally observed when other variables are substantially constant that shorter residence times should be used as the dryer gas outlet temperature increases near the product melting point.

In one particular embodiment, the present invention is applied to the process for spray drying fructose solutions which have been obtained by conventional processes such as the recovery of fructose from invert sugars, or compositions containing invert sugars such as molasses. Fructose which has been obtained by methods such as the enzyme conversion of sucrose or glucose to fructose may also be used. It is generally preferred that the fructose solutions contain little or no impurities; however, solutions containing minor amounts of other sugars, such as sucrose or glucose, may be utilized.

In general, the present process involves dispersion, that is, atomization, of fructose solution into the hot air flowing in a spray dryer while separately feeding substantial proportions of solid fructose particles. The fructose solution may contain from about 30 to about 100 weight percent solids. Where appropriate or desirable, the solution is preheated to aid in pumping and atomization. The solid fructose, preferably recycled product, is separately and concurrently fed to the dryer in amounts sufficient to provide a weight ratio of from 1 to 10, preferably about 3 to about 7 parts of solids, for each part by weight of solids in the solution to be dried. Stated conversely, the weight ratio of solids in the solution to the separately introduced recycled product solids ranges from about 1 to about 0.1, preferably from about 0.33 to about 0.14. The inlet temperature of the hot drying gas preferably is in the range of from about 100 to about 300°C, and the outlet gas temperature is about 78° to about 90° C. The average air residence time is preferably from about 5 to about 20 seconds.

The presently most preferred embodiment of the process of the present invention includes as a further feature the use of recycled fructose product solids having an average particle size of not greater than about 500 microns and preferably not greater than about 200 microns. It is generally undesirable to reduce the average particle size of the product to be recycled below about 50 microns, and preferably the recycled solids will have an average particle size within the range of from about 50 to about 200 microns. Average particle size as used herein means that size where 50 weight percent of the particles are larger and 50 weight percent are smaller.

The most surprising aspect of the present invention is the observation that the unusually high drying temperatures do not result in any noticeable burning and/or darkening of the dry product. This is a truly unexpected result when considered that fructose melts at about 95°C and is known to seriously degrade when heated to temperatures which approach about 110°C. Thus, this invention eliminates the normally practiced addition of materials that inhibit or retard degredation of fructose which occurs at high temperatures.

Fructose solutions from any source may be dried in accordance with the present invention. The solutions are appropriately decolorized or otherwise purified prior to drying, where desired or required, and are concentrated or diluted to the desired solids content (for example, 60 to 75 weight percent solids) prior to drying.

The spray drying operation presently described herein is conducted in conventional equipment such as that disclosed in U.S. Pat. Nos. 3,600,222; 3,704,169 and 3,706,599. Preferably, the spray dryer is operated to dispense the fine size recycle product at the outer periphery of the drying zone as an enveloping solids-bearing atmosphere about the droplets of fructose solution being dried.

Optionally, the dried fructose which is collected from the spray drying zone is conducted to a conditioning zone wherein the still warm dried fructose is conditioned, that is, held quiescently or mechanically agitated. The conditioning of the fructose product permits the formation of particles which are particularly discrete and free flowing. The conditioning of the product may be conveniently conducted using a stationary container or a conventional rotating drum conditioner which is ordinarily used in the sugar industry.

The particulate fructose obtained by the process contemplated herein is stable to long term storage and is particularly suitable as a commercial sucrose substitute.

The invention will be further understood from the following illustrative examples.

EXAMPLE I

A fructose liquor containing 70 weight percent fructose was dried in a spray dryer having a 2.5 ft. diameter, a 6 ft. drying cylinder and a 3 ft. product collection cone. The dryer surface area and volume were 63.8 ft$^2$ and 35 ft$^3$ respectively. The fructose liquor was dispersed through a two fluid nozzle at the dryer bottom with 60 psig air while air was fed into the dryer at the top, resulting in mixed flow drying. Recycle solids were air conveyed to the drying chamber through a half-inch ID tube located about half way up the drying cylinder tangentially to the dryer walls.

In this example, fructose liquor at ambient temperature was fed to the two-fluid atomizer at a rate of 0.26 pounds per minute (equivalent to 0.18 pounds solids/minute). The ratio of recycle solids to liquor solids was 5.0. The recycle solids for the run was crystalline sucrose with a particle size of about 200 microns. Air was fed to the dryer at a rate of approximately 300 cubic feet per minute, giving an average dryer resistance time of about 7 seconds. The air inlet temperature ranged from 143° to 165°C. The outlet air temperature ranged from 82° to 88°C.

Product recovered from the above described run was a white tacky solid with a total moisture content of less than 1 percent. The product was not noticeably burned and had no noticeable "burned" taste, nor did the small amount of material which was held up in the dryer. The product upon standing for several days did not crystallize (that is, remained tacky). From this example it was concluded that 100 percent sucrose recycle solids are not suitable for the practice of the invention.

EXAMPLE II

Another run was conducted in the same equipment and under conditions generally similar to those of Example I. In this run all recycled solids were crystalline fructose with a particle size of about 400 microns. The inlet air temperature was 160°C and air outlet temperature was 88°C.

The recovered product was a white particulate solid which upon conditioning for about one hour at ambient temperature was free flowing. The total moisture content of the product was less than 1 percent. There was no noticeable darkening or off-white character or "burned" taste to the product.

EXAMPLE III

Another run was conducted in the same equipment and under conditions generally similar to those of Example I. For this run, solid product from Example II was used as recycle solids. The inlet air temperature was 158°C and air outlet temperature ranged from 83° to 85°C.

The product looked and behaved the same as the product obtained in Example II.

EXAMPLE IV

Another run was conducted in the same equipment and under conditions generally similar to those of Example I. Recycle solids were sieved product from Example III. The inlet air was 165 to 177°C and air outlet temperature was 93°C.

No product was obtained from this run. Material fed to dryer was present as melted fructose held up on the dryer walls. This melted material did not crystallize on standing even though the total moisture content was less than 1 percent. The held up material in the dryer was not noticeably burned.

EXAMPLE V

This exemplary run was essentially a repeat of Example II. The inlet air temperature ranged from 138° to 149°C and air outlet was 85°C.

The recovered product had a total moisture content of less than 1 percent and after about 1 hour conditioning at ambient temperature was a free flowing white particulate solid.

These examples clearly indicate that high quality particulate free-flowing fructose may be readily obtained by use of the present invention.

What is claimed is:

1. A process for preparing dried solid fructose particulate free-flowing products from fructose solutions comprising:
   a. Drying dispersed fructose solution in a current of heated gas and in the presence of 1 to 10 parts by weight of separately introduced recycled product solids per part by weight of solids in the solution to be dried; and
   b. Supplying the hot drying gas at an outlet temperature of 60° to 120° C while maintaining average product residence time in the drying zone at about 30 seconds or less.

2. The process of claim 1 in which the hot drying gas inlet temperature is in the range of from 100 to 300°C.

3. The process of claim 2 in which the average product residence time is maintained between 4 seconds and 30 seconds.

4. A process for preparing dry fructose products comprising:
   a. dispersing fructose particles having a particle size of less than about 500 microns in a current of heated air having an inlet temperature of at least 100°C;
   b. separately dispersing in the heated gas from about 1 to about 0.1 parts by weight, dry solids basis, of a fructose solution, per part by weight of said particles;
   c. evaporating the water from the solution;
   d. separating the resulting dry product from the hot gas stream having a temperature of 60 to 120°C;
   e. recycling the necessary amounts of dry product material from step (d) to provide the particles used in the dispersion step (a); and
   f. recovering the remainder of the dry product.

5. The process of claim 4 wherein the product recycled in step (e) is reduced to an average particle size of about 200 microns or less before introduction to the dispersion step (a).

6. The process of claim 5 wherein the size reduction is sufficient to provide an average particle size within the range of from about 50 to about 200 microns.

7. The process of claim 4 wherein the product obtained at step (d) is conditioned until the product is free flowing.

8. The process of claim 4 wherein the fructose solution contains 30 to 100 percent by weight fructose solids.

9. The process of claim 8 wherein the solution contains less than 58 percent by weight non-fructose sugar solids.

* * * * *